UNITED STATES PATENT OFFICE.

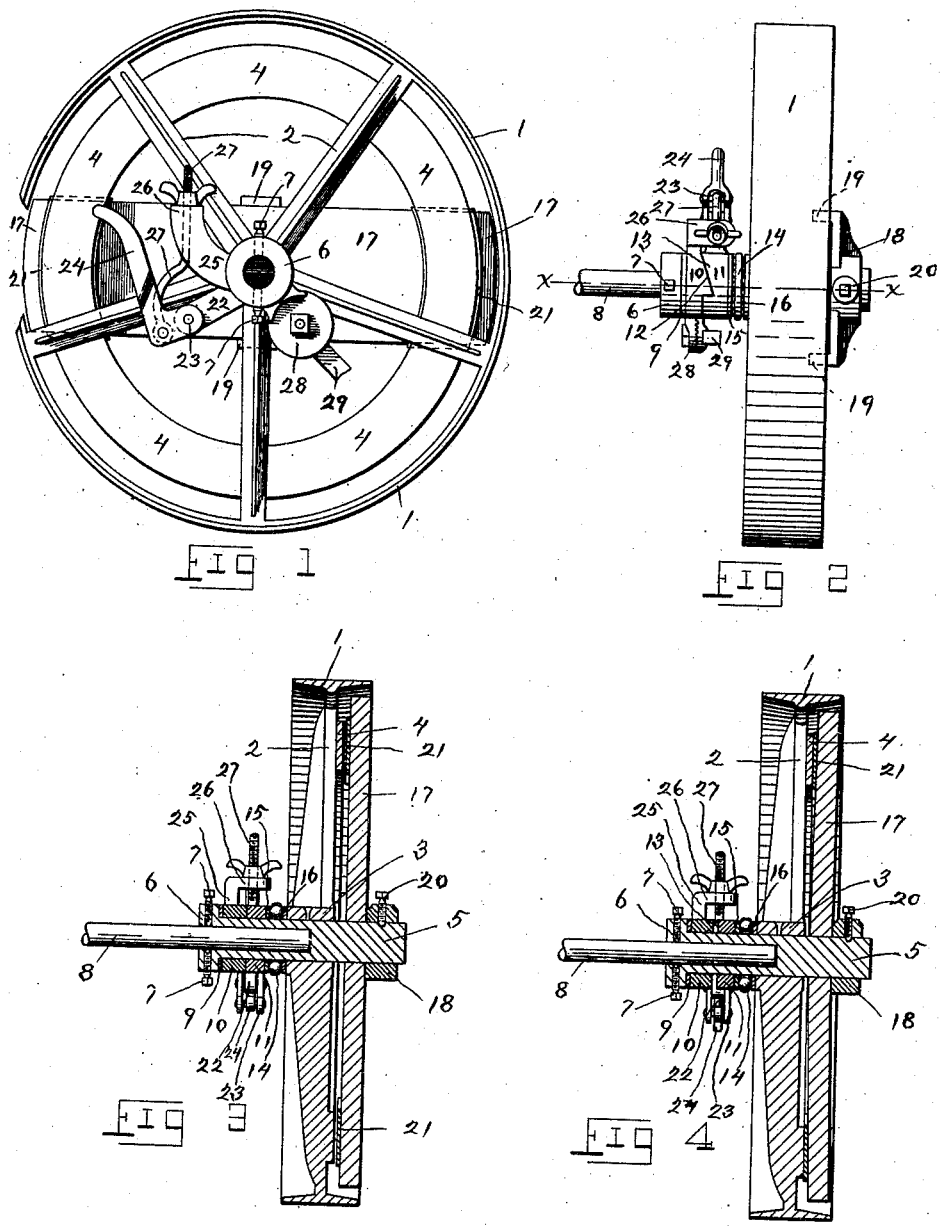

HENRY R. HERR, OF LANCASTER, PENNSYLVANIA.

FRICTION-PULLEY.

986,567.

Specification of Letters Patent.

Patented Mar. 14, 1911.

Application filed June 13, 1910. Serial No. 566,509.

*To all whom it may concern:*

Be it known that I, HENRY R. HERR, a citizen of the United States, residing at Lancaster, in the county of Lancaster and State of Pennsylvania, have invented certain new and useful Improvements in Friction-Pulleys, of which the following is a specification, reference being had therein to the accompanying drawing.

My invention relates to a friction pulley and more particularly to that class intended for use with cream separators using light power, such as a gas engine, but the invention may be used for transmitting power to any light machinery.

The objects of the invention are to provide a friction pulley that shall be simple, durable and effective, and capable of a very sensitive action, allowing for slipping upon being overloaded.

Another object being in a pulley of this class to provide means for adjustment of the friction and a novel clutch for throwing the pulley in and out of engagement.

With these and other objects in view my invention consists in certain construction and combination of parts as will hereinafter be fully described and claimed in the accompanying drawings which form a part of this application and in which like figures of reference refer to corresponding parts in all of the views; but it is fully understood that while I have here described my invention as shown, that I do not confine myself to the exact design as shown, as slight changes may be made in the construction and arrangement of the several parts without departing from the spirit of the invention.

In the drawings:—Figure 1, is a rear elevation of the pulley, showing the clutch in a position for allowing the pulley to run loose. Fig. 2, is a side elevation of the same. Fig. 3, is a vertical sectional view of the same. Fig. 4, is a similar view showing the expanding collar in position for applying the friction.

Referring to the drawings, the pulley comprises the usual belt-wheel 1, webbed spokes 2, and hub 3; the spokes 2, having attached thereto the friction ring 4. The belt-wheel normally runs loose on a spindle 5, which is formed upon the inner end with a flange 6, which is supplied with the set screws 7, for attaching said spindle 5, upon the end of the shaft 8, of the machine; said spindle 5, being bored to receive the shaft. Upon said spindle 5, and adjacent to the flange 6, and separated therefrom by a hardened washer 9, is an expanding collar which comprises the two members 10, and 11; the adjacent sides of which are formed with beveled portions 12, and 13. While between said collar members 10, and 11, and the hub 3, of the belt-wheel is mounted upon the spindle 5, a thrust ball-bearing 14, which bears against the hardened washers 15, and 16, upon said spindle 5; and upon the opposite side of said hub 3, is rigidly secured a friction plate 17, by a clamp 18, which is formed with the lugs 19, for engaging the edges of said plate 17, and a set screw 20, for engaging said spindle 5. Said friction plate 17, is preferably of wood or other suitable material having a slight resilient quality and is supplied near its ends with the removable friction pads 21, of leather or other material, and which are designed to form a gripping contact with the face of the ring 4, when brought together by the action of the clutch.

The expanding collar member 11, is formed with an arm 22, upon the end of which is pivoted the bifurcated end 23, of an eccentric hand trip-lever 24; while the collar member 10, is provided with an arm 25, formed with an angular bent end 26, provided with a hole within which is mounted an adjusting rod 27, having its lower end pivoted to the trip-lever 24, and its upper end extending through said end and having a thumb nut threaded thereon for adjustment. The expanding collar member 10, is also provided with an adjustable arm 28, which is provided with an arm 29, designed to engage with the frame of the machine to prevent the collar from revolving on the spindle.

In the operation of the device it will be seen that having set the adjusting rod 27, to produce the proper tension and throwing the trip-lever down in the position shown in Fig. 4, the arms 22, and 25, will be brought nearer together, and the collar member 11, turned, thus sliding the beveled portions on each other and expanding the collar members on the spindle forcing the friction surfaces together, so that the belt-wheel will revolve the spindle. Upon raising the trip-lever the frictional contact will be released and the pulley run idle; while if the machine sticks or is overloaded, the friction surfaces will slip and the strain be relieved.

Having thus described my invention what

I claim as new and desire to secure by Letters Patent is:—

In a frictional pulley of the class described, comprising a spindle, a belt-wheel rotatably mounted on said spindle, a friction plate secured upon said spindle adjacent thereto, coacting friction surfaces on said belt-wheel and said plate, an expanding collar mounted upon said spindle and composed of two members having oppositely beveled contacting surfaces, arms projecting from said members, an eccentric trip-lever pivoted upon one of said arms, an adjustable rod joining said lever and the arm of the other member for the purpose of moving said members upon each other and expanding said collar by the action of said trip-lever, and means for engagement with the frame of the machine on which the pulley is mounted for preventing the revolution of said collar upon said spindle.

In testimony whereof I affix my signature in presence of two witnesses.

HENRY R. HERR.

Witnesses:
WM. J. COULTER,
JOHN J. THOMPSON.

Copies of this patent may be obtained for five cents each, by addressing the "Commissioner of Patents, Washington, D. C."